(12) United States Patent
Wick et al.

(10) Patent No.: US 8,260,313 B1
(45) Date of Patent: Sep. 4, 2012

(54) APPARATUS AND METHOD FOR MODIFYING SERVICE-ACCESS-POINT DATA WITHIN THE APPARATUS

(75) Inventors: Ryan A. Wick, Punta Gorda, FL (US); Raymond E. Reeves, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 444 days.

(21) Appl. No.: 12/534,165

(22) Filed: Aug. 3, 2009

(51) Int. Cl.
*H04W 24/00* (2009.01)

(52) U.S. Cl. .................. 455/456.1; 455/456.6; 455/423; 455/466; 455/561; 455/414.1; 455/414.2; 455/414.3; 455/456.4; 455/404.2; 455/456.5; 342/386

(58) Field of Classification Search ............... 455/404.2, 455/425, 550.1, 552.1, 41.2, 456.4–457, 455/461, 556.1, 556.2, 456.1, 456.6, 423, 455/466, 561, 414.1–414.3, 456.5; 342/386
See application file for complete search history.

(56) References Cited

U.S. PATENT DOCUMENTS

| | | | |
|---|---|---|---|
| 4,845,710 A | 7/1989 | Nakamura et al. | |
| 5,444,848 A | 8/1995 | Johnson, Jr. et al. | |
| 7,130,641 B1 | 10/2006 | Al-Khashti et al. | |
| 7,254,388 B2 | 8/2007 | Nam et al. | |
| 7,441,032 B2 | 10/2008 | Requena | |
| 7,475,140 B2 | 1/2009 | Requena | |
| 2002/0049063 A1* | 4/2002 | Nohara et al. | 455/456 |
| 2004/0166881 A1* | 8/2004 | Farchmin | 455/457 |
| 2006/0240840 A1* | 10/2006 | Morgan et al. | 455/456.1 |
| 2008/0238767 A1* | 10/2008 | Zhou | 342/357.06 |
| 2009/0138439 A1* | 5/2009 | Yeung et al. | 707/3 |

OTHER PUBLICATIONS

Javvin Network Management & Security, Network, Networking Technology, Data Communication Terms, Glossary and Dictionary, SAPI: Service Access Point Identifier, downloaded from the World Wide Web at http://www.javvin.com/networkingterms/SAPI.html on Jul. 24, 2009.

Mobile Positioning, downloaded from the World Wide Web at http://www.mobilein.com/mobile_positioning.htm on Jul. 24, 2009.

SearchNetworking.com Definitions, Network Service Access Point, downloaded from the World Wide Web at http://searchnetworking.techtarget.com/sDefinition/0,,sid7_gci549068,00.html on Jul. 24, 2009.

Introducing eGPS, Purpose-designed positioning for handsets, Combined GPS/cellular data creates universal positioning data, downloaded from the World Wide Web at http://www.csr.com/egps/technology.htm on Jul. 10, 2009.

(Continued)

*Primary Examiner* — Kamran Afshar
*Assistant Examiner* — Manpreet Matharu

(57) ABSTRACT

An apparatus may comprise a location-aware application, a first location detector, and a data storage device. The storage device may contain service-access-point (SAP) data that identifies a first SAP through which the apparatus may access a second location detector. The first detector may obtain data from the second detector via the first SAP and use the obtained data to determine a location of the apparatus. This determined location may be provided to the location-aware application. The data storage may include program instructions for modifying the SAP data such that the SAP data identifies a second SAP through which the apparatus may access a third location detector. The first detector may obtain data from the third detector via the second SAP and then use the obtained data to determine a location of the apparatus. This determined location may be provided to another location-aware application that is executable at the apparatus.

16 Claims, 4 Drawing Sheets

OTHER PUBLICATIONS

Introducing eGPS, Purpose-designed positioning for handsets, eGPS: positioning technology that always works, downloaded from the World Wide Web at http://www.csr.com/egps/introduction.htm on Jul. 10, 2009.

Introducing eGPS, Purpose-designed positioning for handsets, A dedicated architecture for handsets, downloaded from the World Wide Web at http://www.csr.com/egps/cst-approach.htm on Jul. 10, 2009.

Introducing eGPS, Purpose-designed positioning for handsets, Early 'handset GPS' Implementations have disappointed, downloaded from the World Wide Web at http://www.csr.com/egps/othersolutions.htm on Jul. 10, 2009.

Introducing eGPS, Purpose-designed positioning for handsets, What users want, where they want it, downloaded from the World Wide Web at http://www.csr.com/egps/users.htm on Jul. 10, 2009.

Introducing eGPS, Purpose-designed positioning for handsets, Fast and reliable positioning—everywhere, downloaded from the World Wide Web at http://www.csr.com/egps/index.htm on Jul. 10, 2009.

Single-chip Bluetooth: an overview of BlueCore design options, downloaded from the World Wide Web at http://www.csr.com/products/bcrange.htm, Considered with downloaded date from the World Wide Web at http://www.csr.com/products/bcrange.htm, on Jul. 10, 2009.

SiRF, SiRFDiRect, Enhanced GPS + Dead Reckoning Software for Portable Devices, Product Overview, Nov. 2007.

Java Virtual Machine, downloaded from the World Wide Web at http://en.wikipedia.org/wiki.Jvm on Apr. 27, 2009.

Binary Runtime Environment for Wireless, archived at http://web.archive.org/web/20071018132057/http://en.wikipedia.org.wiki/BREW on Oct. 18, 2007.

\* cited by examiner

APPARATUS AND METHOD FOR MODIFYING SERVICE-ACCESS-POINT DATA WITHIN THE APPARATUS

BACKGROUND

Recent advances in various technologies have allowed devices, such as cellular phones, personal digital assistants (PDAs), and telematics devices in automobiles, to determine their location. After a given one of these devices determines its location, the given device may process data that indicates the location of the device and thereafter notify a user (e.g., visually and/or audibly) as to the location of the device. In this way, when the user is in the same location as the device, the user is notified of his or her location as well.

Each of the foregoing devices may be operable to communicate with a system that provides one or more services to the device. The one or more services may include a service that assists the device in determining its location. The foregoing system may be maintained and/or operated by a service provider that tracks, individually and/or collectively, the amount of service provided to each of the devices. Such tracking may allow the service provider to charge the user of each device an appropriate fee for using the system, and/or to estimate capacity requirements of the system. As the amount of service provided by the system increases, an estimate of capacity requirements may be used by the service provider to plan for expansion of the system.

In addition to challenges that are associated with expanding the system, a service provider may be challenged to provide a desired quality-of-service to the devices using the system. One way to assist the service provider in providing the desired quality-of-service may include preventing a device from requesting service from (i) an element of the system that is not operable to perform the requested service, or (ii) an element of the system that is not the optimum element for performing the requested service. Such prevention may greatly improve the quality of service provided by the system.

OVERVIEW

The present invention provides for modifying data at an apparatus. The apparatus is operable to access a system element via a service-access-point so as to obtain data from the system element. A given application executable at the apparatus may be associated with a given service-access-point, and another service-access-point may be set as the service-access-point through which the apparatus is to access a system element. The apparatus may maintain identifiers of each of the service-access-points. The apparatus may compare the service-access-point identifiers when the given application requires data from a system element. If the identifiers do not match, the apparatus may modify data maintained at the apparatus such that the identifier of the service-access-point set for accessing the system element matches the service-access-point identifier associated with the given application. In this way, the apparatus may be configured to request data from an optimum and/or preferred system element that is operable to provide data to the apparatus.

In one respect, an exemplary embodiment of the invention may take the form of a method carried out at a user-device comprising a data storage device, a processor, and a first location detector. This exemplary method comprises the data storage device maintaining a first application, first service-access-point (SAP) data, and second SAP data, the processor receiving from the first application a first request for the location of the user-device and, in response to receiving the first request, determining whether the first SAP data matches the second SAP data. The first location detector is configured to (i) obtain data from a second location detector, (ii) determine a location of the user-device based, at least in part, on the data obtained from the second location detector, and (iii) provide the first application with the determined location of the user-device. The second location detector is accessible to the first location detector via a SAP identified by the second SAP data. If the processor determines that the first SAP data does not match the second SAP data, then the processor executes computer-readable program instructions to (i) modify the second SAP data to match the first SAP data, (ii) notify the first location detector that the second SAP data is being modified to match the first SAP data, and (iii) send to the first location detector a second request for the location of the user-device. Otherwise, if the processor determines that the first SAP data matches the second SAP data, then the processor executes computer-readable program instructions to send to the first location detector the second request for the location of the user-device.

In another respect, an exemplary embodiment of the invention may take the form of a user-device comprising (i) a processor, (ii) a data storage device that contains a first application, first SAP data, and second SAP data, and (iii) a first location detector configured to obtain data from a second location detector, determine a location of the user-device based, at least in part, on the data obtained from the second location detector, and provide the first application with the determined location of the user-device. The second location detector is accessible to the first location detector via a SAP identified by the second SAP data. The processor is operable, in response to receipt of a first request for the location of the user-device, to determine whether the first SAP data matches the second SAP data. If the processor determines that the first SAP data does not match the second SAP data, then the processor modifies the second SAP data to match the first SAP data, notifies the first location detector that the second SAP data is being modified to match the first SAP data, and sends to the first location detector a second request for the location of the user-device. Otherwise, if the processor determines that the first SAP data matches the second SAP data, then the processor sends to the first location detector the second request for the location of the user-device.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Introduction

The present invention provides for an apparatus (e.g., a user-device) and method for modifying data maintained within the apparatus. The apparatus may comprise a first location detector, and a data storage device for maintaining data including the modified data. The data maintained in the data storage device may comprise service-access-point (SAP) data that identifies a service-access-point through which the apparatus can access a second location detector. Modifying the data, in accordance with the exemplary embodiments described herein, allows the apparatus to request service from a system element (e.g., the second location detector) that is appropriate for carrying out the requested service, and in some cases, from a system element that is the optimum and/or preferred system element for carrying out the requested service. As an example, after modifying the data, the apparatus may communicate with the second location detector via the service-access-point so as to obtain data that the first location detector can use to determine a location of the apparatus.

2. Exemplary Architecture

Figure 1:
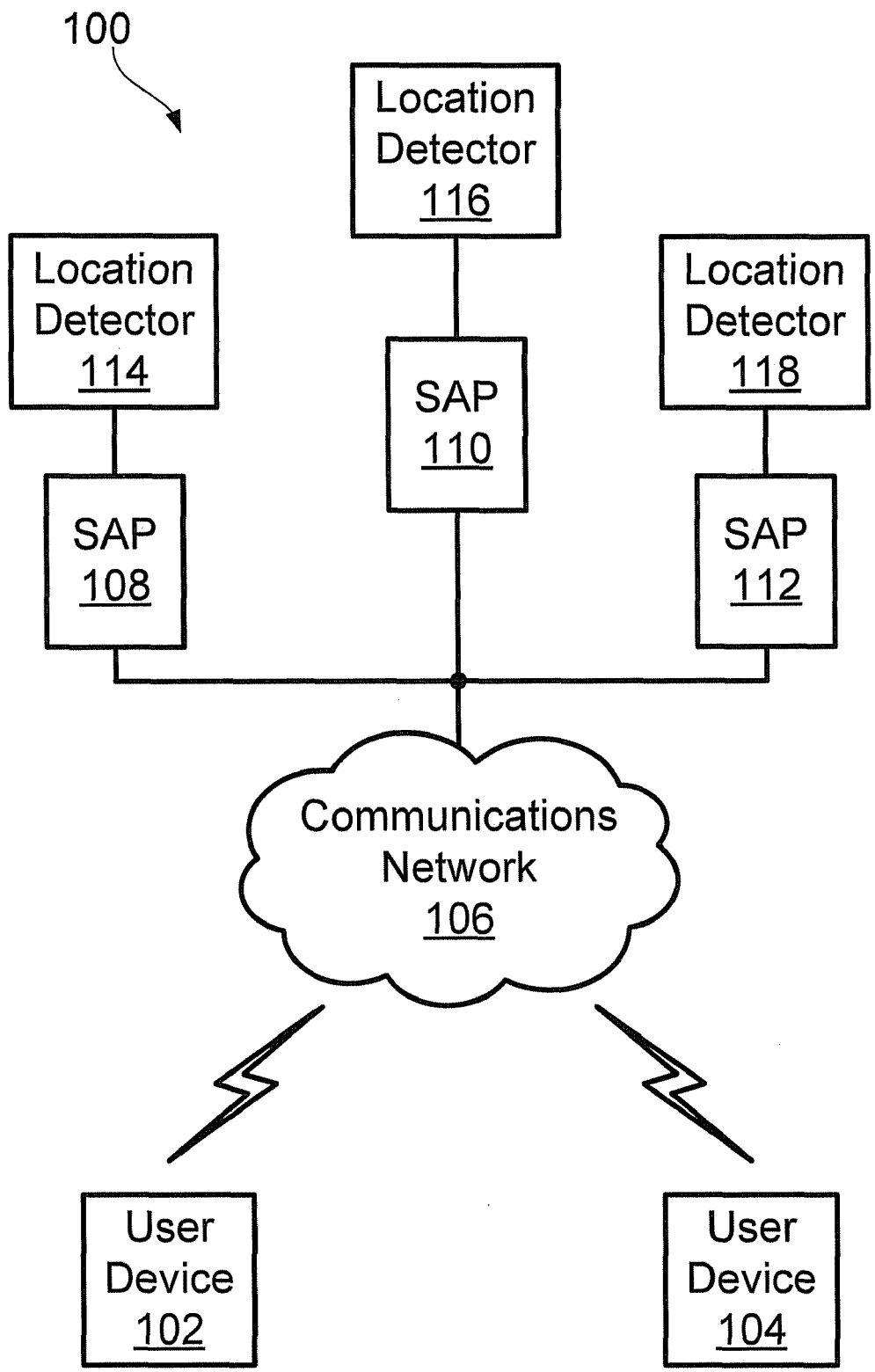
FIG. 1 is a block diagram of an exemplary system architecture in which exemplary embodiments may be carried out.

FIG. 1 depicts an exemplary system architecture 100 in which exemplary embodiments may be carried out. It should be understood that the arrangement of system architecture 100 and other arrangements illustrated and/or described herein are set forth only as examples. Those skilled in the art will appreciate that other arrangements and elements (e.g., machines, interfaces, functions, orders, and groupings of functions, etc.) can be used instead, and that some elements may be omitted altogether. Many of the elements described herein are functional entities that may be implemented as discrete or distributed components or in conjunction with other components, and in any suitable combination and location. Various functions described herein as being performed by one or more elements may be carried out by hardware, firmware, software (e.g., computer-readable program instructions that are stored at a data storage device and executable by a processor), or some combination of hardware, firmware, and software. For purposes of this description, the word "exemplary" is used to mean "serving as an example, instance, or illustration." Any embodiment or element described herein as "exemplary" is not necessarily to be construed as preferred or advantageous over other embodiments or elements.

System architecture 100 includes user-devices 102, 104, a communications network 106, service-access-points 108, 110, 112, and location detectors 114, 116, 118. User-devices 102, 104 may communicate with one or more of the service-access-points 108, 110, 112 and location detectors 114, 116, 118 via communications network 106. Location detector 114 may be accessible to user-devices 102, 104 via service-access-point 108. Location detector 116 may be accessible to user-devices 102, 104 via service-access-point 110. And location detector 118 may be accessible to user-devices 102, 104 via service-access-point 112. Location detectors 114, 116, 118 may be operable to determine a location of user-devices 102, 104 and/or to determine data usable by another location detector (e.g., a location detector within user-device 102 or user-device 104) to determine a location of the other user-device.

Communications network 106 may comprise a wireless network (e.g., a cellular communications network). A typical wireless network includes multiple base stations that transmit radio frequency (RF) signals from an antenna so as to form a cell and/or a cell sector. The base stations may be referred to as access networks. When user-devices 102, 104 are located within the cell and/or cell sector, the user-devices may receive a portion of the RF signals transmitted from a base station. User-devices 102, 104 may transmit RF signals that can be received by one or more of the access networks. The transmission of RF signals from an access network to user-devices 102, 104 occurs in a forward-link direction, whereas transmission of RF signals from user-devices 102, 104 to an access network occurs in a reverse-link direction.

The RF signals transmitted from an access network and the RF signals transmitted from the user-devices 102, 104 may be arranged according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." Another protocol that may be used is known as Evolution Data Optimized (EV-DO) or 1×EV-DO, perhaps in conformance with one or more industry specifications such as IS-856, Release 0 and IS-856, Revision A. Other wireless protocols may be used as well, such as Global System for Mobile Communications (GSM), Time Division Multiple Access (TDMA), and/or any others.

Communications network 106 may also comprise a wireline network. A wireline network may be arranged in any of a variety of configurations. For example, a wireline network may include one or more electrical conductors (e.g., copper wires) and/or one or more optical fibers. As another example, the wireline network may be arranged as a local area network (LAN), a wide area network (WAN), or a synchronous optical network (SONET). The wireline network may connect the wireless communications network to one or more service-access-points (e.g., one or more of service access points 106, 108, 110). Other exemplary configurations of a wireline network are also possible.

Each of the service-access-points 106, 108, 110 may comprise a logical point between communications network 106 and a system element (e.g., one of location detectors 114, 116, 118) that interfaces to communications network 106. Each of the logical points may be identified by a service-access-point identifier, such as an Internet Protocol (IP) address, a uniform resource locator (URL), or some other identifier. User-devices 102, 104 may maintain identifiers for one or more of the service-access-points 106, 108, 110, and generate communications to a system element that interfaces to one of service-access-points 106, 108, 110. Each of the location detectors 114, 116, 118 may be arranged in any of a variety of configurations. As example, one or more of the location detectors 114, 116, 118 may comprise a device that uses an angle-of-arrival method to determine a location of a user-device (e.g., user-device 102 or 104). As another example, one or more of the location detectors 114, 116, 118 may comprise a device that uses a time-of-arrival method to determine a location of the user-device. As yet another example, one or more of the location detectors 114, 116, 118 may comprise a device that uses a signaling system 7 (SS7) message containing a cell site identifier of a cell that is serving the user-device so as to determine a location of a user-device. As still yet another example, one or more of location detectors 114, 116, 118 may comprise positioning determining equipment (PDE) within communications network 106. Other exemplary configurations of location detectors 114, 116, 118 are also possible.

Figure 2:
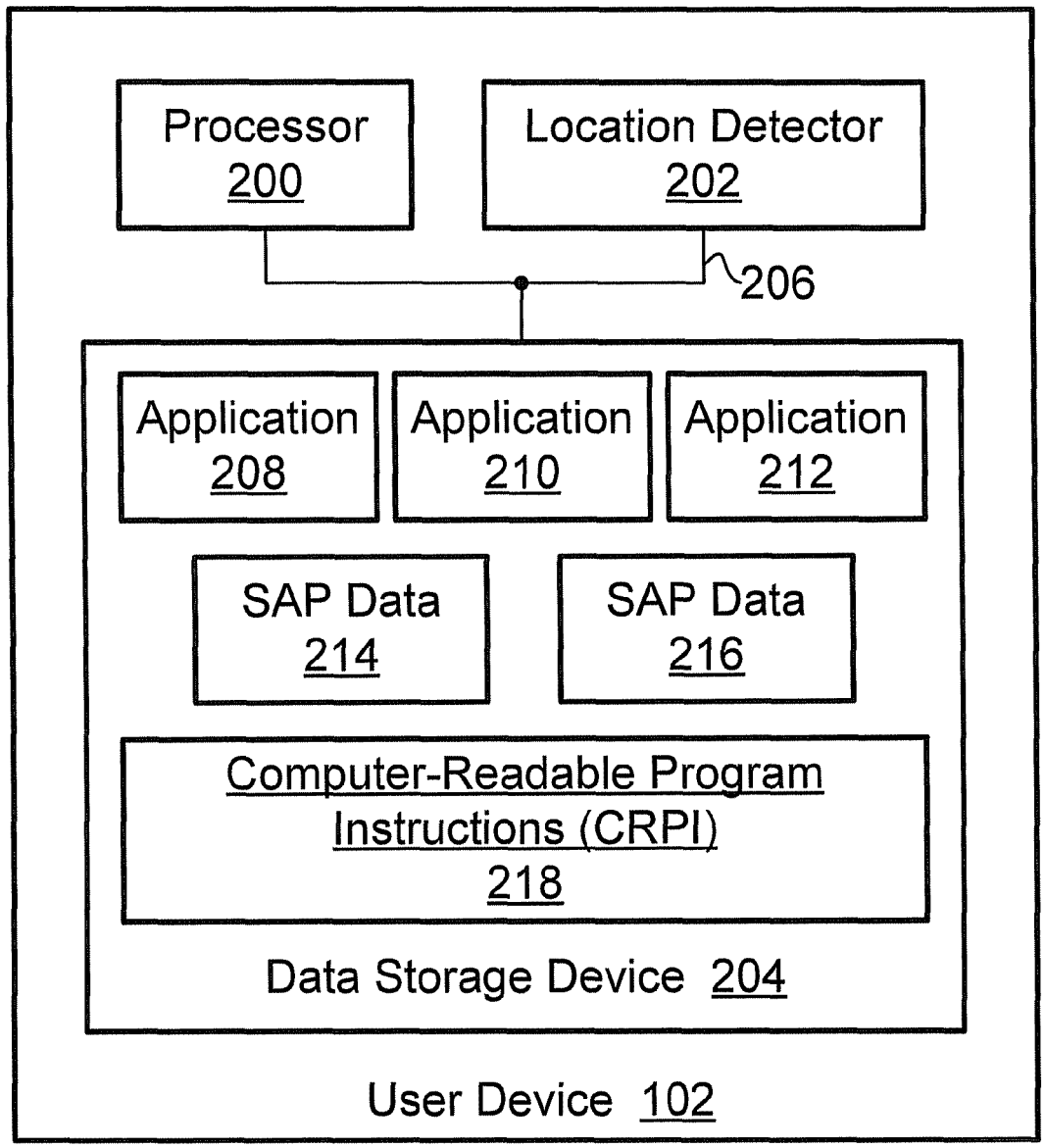
FIG. 2 is a block diagram of an exemplary user-device that is operable in the system architecture illustrated in FIG. 1.

Next, FIG. 2 is a block diagram of user-device 102. User-device 102 may be arranged in any of a variety of configurations, and user-device 104 may be arranged in a configuration similar to that of user-device 102. As an example, user-device 102 may be arranged as and/or to include a wireless communication device (e.g., a cellular phone operable to make voice calls), a navigation device (e.g., a device operable to display maps and provide audible directions), a personal digital assistant (PDA) device (e.g., a Centro™ PDA by Palm, Inc., Sunnyvale, Calif., United States), a telematics device in an automobile, or some combination of these devices. Other exemplary arrangements of user-device 102 are also possible.

As illustrated in FIG. 2, user-device 102 includes a processor 200, a location detector 202, and a data storage device 204, all of which may be linked together via a system bus, network, or other connection mechanism 206. Processor 200 may comprise one or more general purpose processors (e.g., INTEL microprocessors) or one or more special purpose processors (e.g., digital signal processors). Alternatively, processor 200 may comprise one or more general purpose processors and one or more special purpose processors. Processor 200 may execute computer-readable program instructions (CRPI) 218 that are maintained at data storage device 204.

Data storage device 204 comprises a computer-readable storage medium readable by processor 200. The computer-readable storage medium may comprise volatile and/or non-volatile storage components, such as optical, magnetic, organic or other memory or disc storage, which can be integrated in whole or in part with processor 200.

Data storage device 204 contains applications 208, 210, 212, service access point (SAP) data 214, 216, and computer-readable program instructions (CRPI) 218. Applications 208, 210, 212 may comprise computer-readable program instructions contained within CRPI 218. For purposes of this description, application 208 is referred to as a first application, application 210 is referred to as a second application, and application 212 is referred to as a third application.

Applications 208, 210, 212 may each comprise a respective location-aware application that is operable to determine a location of user-device 102 via a location detector. As an example, application 208 may determine a location of user-device 102 via location detector 202. As another example, a location-aware application may comprise an application for asset-tracking that tracks locations at which a user-device is used or transported to, an application that provides turn-by-turn directions for navigating to a desired location, and/or an application for providing weather information or point-of-interest information for the location or within a given distance (e.g., 1 mile) of the location of the user-device.

Processor 200 may execute (e.g., run) applications 208, 210, 212. In one respect, processor 200 may execute only one of applications 208, 210, 212 at any given time. In another respect, processor 200 may execute more than one of the applications 208, 210, 212 at any given time.

Location detector 202 is operable to determine a location of user-device 102. In one respect, location detector 202 may determine the location of user-device 102 without having to obtain data from another location detector (e.g., location detector 114). In accordance with this embodiment, location detector 202 may nevertheless obtain data from the other location detector for various reasons, such as confirming accuracy of a determined location or improving accuracy of a determined location. In another respect, location detector 202 may obtain data from another location detector (e.g., location detector 116), and use the obtained data to determine the location of user-device 102.

Location detector 202 may comprise various elements that are operable, alone or in combination, to determine a location of user-device 102. As an example, location detector 202 may comprise computer-readable program instructions that are executable to determine a location of user-device 102 and/or to cause other elements of location detector 202 to carry out functions for determining the location of user-device 102. The computer-readable program instructions of location detector 202 may be contained within CRPI 218. As another example, location detector 202 may comprise a GPS chipset such as a SiRFstarIII GSC3/LP chipset manufactured by SiRF Technology, Inc., San Jose, Calif., United States. The GPS chipset may be operable to determine a location of user-device 102 from signals that are transmitted from a plurality of satellites of a global positioning satellite system. As yet another example, location detector 202 may comprise a gyroscope (e.g., a MEMS gyroscope) for making directional measurements and determining a location of user-device 102 when satellite signals for the GPS chipset are unavailable to the chipset. Other examples of location detector 202 are also possible.

SAP data 214 may comprise data that identifies one or more service-access-points from which user-device 102, and in particular, location detector 202, may obtain data for use in determining a location of user-device 102. Table 1 shows an example of SAP data 214. Each service-access-point identified by SAP data 214 may be associated with one or more applications contained within data storage device 204.

TABLE 1

Exemplary SAP Data 214

| Application | Service-access-point | Service-access-point (SAP) Identifier | |
|---|---|---|---|
| | | IP Address | Port Address |
| Application 208 | SAP 108 | 192.0.2.235 | 384 |
| Application 210 | SAP 110 | 144.232.20.88 | 384 |
| Application 212 | SAP 112 | 63.173.24.182 | 850 |

In Table 1, applications 208, 210, 212 are associated with service-access-points 108, 110, 112, respectively. As illustrated in Table 1, each service-access-point is identified by a respective combination of an Internet Protocol (IP) address and a port address. Alternatively, one or more of service-access-points 108, 110, 112 or another service-access-point may be identified by a uniform resource locator (URL) or some other service-access-point identifier. Additionally, two or more applications may be associated with a common service-access-point and service-access-point identifier.

Next, SAP data 216 may comprise data that is identical to some portion of the data maintained as SAP data 214. SAP data 216 may be maintained at a position in data storage device 204 that is different from a position where SAP data 214 is maintained. User-device 102 may use SAP data 216 to identify a service-access-point that is set at location detector 202 as the service-access-point from which location detector 202 accesses a system element to request data. The requested data may comprise data for use in determining a location of user-device 102 or for some other purpose. Processor 200 may execute program instructions of CRPI 218 to set a service-access-point identified by SAP data 214 as the service-access-point that is identified by SAP data 216. For purposes of this description, a service-access-point identified by SAP data 214 may be referred to as first SAP data, and SAP data 216 and/or a service-access-point identified by SAP data 216 may be referred to as second SAP data.

As an example, SAP data 216 may comprise data that identifies IP address 192.0.2.235 and port address 384. Additionally or alternatively, if the IP address 192.0.2.235 and port address 384 are stored at a given storage position of data storage device 204, then SAP data 216 may comprise a pointer to the given data storage position of data storage device 204.

Computer-readable program instructions (CRPI) 218 may comprise any of a variety of program instructions. Several examples of these program instructions are described in the section entitled "Exemplary operation." In addition to those examples of program instructions, CRPI 218 may comprise program instructions that are executable as a Java virtual machine, and program instructions that are executable as a binary runtime environment for wireless (BREW) layer between the Java virtual machine and location detector 202. Applications 208, 210, 212 may communicate with the Java Virtual machine. Communications between the applications and the Java Virtual machine may include requests for data from a system element, and responses including data from a system element.

3. Exemplary Operation

Figure 3:
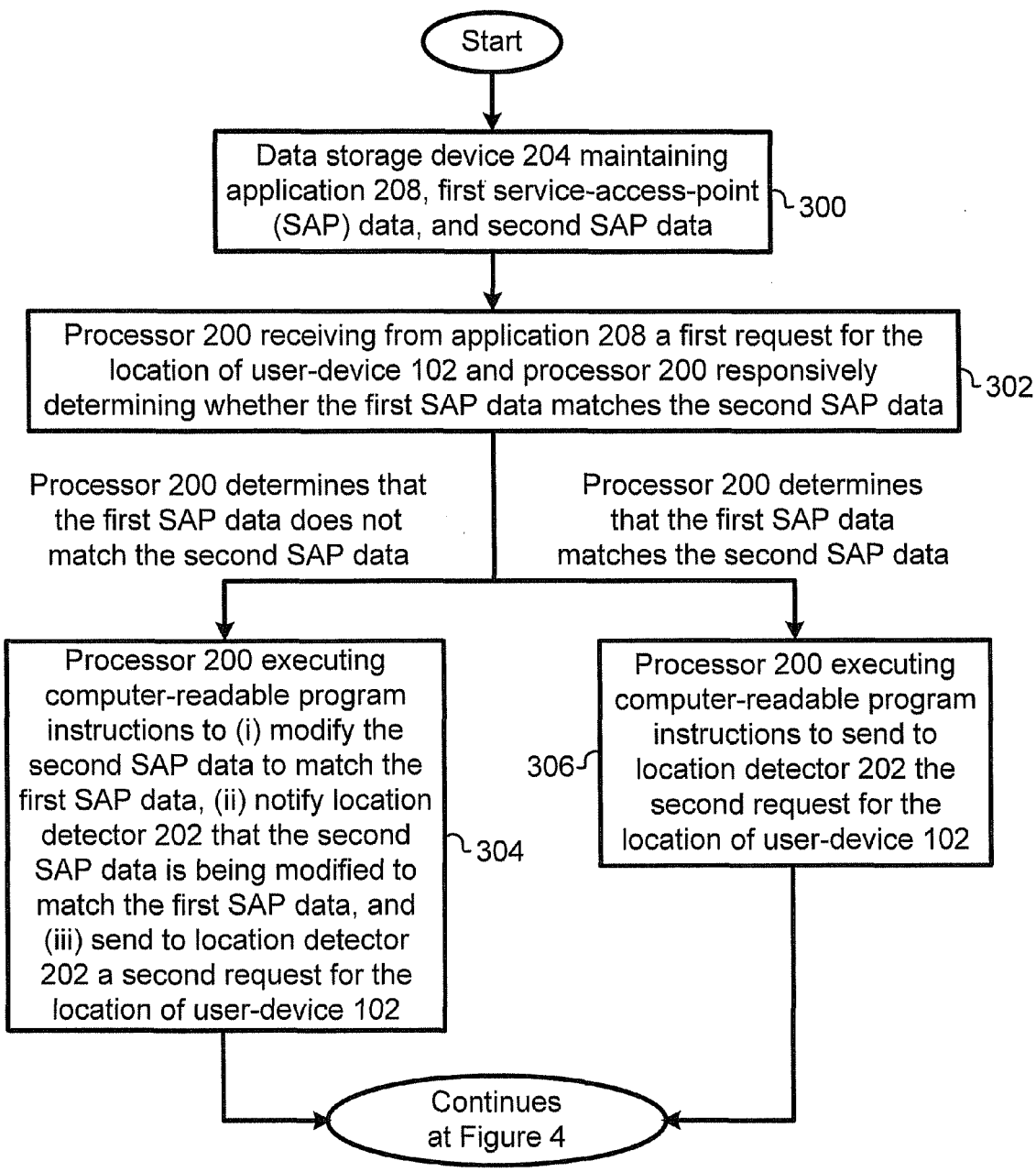
FIG. 3 is a flow chart depicting a set of functions that may be carried out in accordance with an exemplary embodiment.

Next, FIG. 3 is a flow chart provided to illustrate a set of functions that may be carried out in accordance with an exemplary embodiment. The functions of FIG. 3 are described as being carried out by various elements shown in FIG. 1 and/or FIG. 2. A person having ordinary skill in the art will understand that other elements shown in FIG. 1 or FIG. 2 may be substituted in place of some of the elements used to describe FIG. 3. For example, user-device 102 may be substituted with user-device 104, and/or application 208 may be substituted with application 212.

Block 300 includes data storage device 204 maintaining application 208, first SAP data, and second SAP data. As described above, application 208 may comprise a location-aware application. The first SAP data (e.g., a service-access-point identified by SAP data 214) is associated with an application (e.g., application 208) and identifies a service-access-point through which user-device 102 may access a location detector other than location detector 202 (e.g., location detector 114, 116, or 118) for that application. The second SAP data (e.g., SAP data 216) identifies a service-access-point that is set at location detector 202 for accessing a location detector other than location detector 202. The first SAP data associated with the application may or may not match the second SAP data.

Next, block 302 includes processor 200 receiving from application 208 a first request for the location of user-device 102 and processor 200 responsively determining whether the first SAP data matches the second SAP data. The first request for the location of user-device 102 may be sent to processor 200 at any of a variety of times. For example, the first request may be sent to processor 200 at a time when application 208 is unaware of the location of the user-device 102. This may occur within a short time (e.g., 1 to 10 seconds) after processor 200 launches (e.g., begins executing) application 208. As another example, the first request may be sent to processor 200 at a time when application 208 is aware of the location of user-device 102. Application 208 may be aware of the location due to a location determination carried out prior to the first request being sent.

If processor 200 determines that the first SAP data does not match the second SAP data, then block 304 may be carried out. Block 304 includes processor 200 executing computer-readable program instructions to (i) modify the second SAP data to match the first SAP data, (ii) notify location detector 202 that the second SAP data is being modified to match the first SAP data, and (iii) send to location detector 202 a second request for the location of user-device 102. These program instructions may be contained within CRPI 218.

Execution of the program instructions (e.g., first program instructions) to modify the second SAP data to match the first SAP data may cause various functions to be carried out. For example, executing the first program instructions may cause data storage device 204 to replace the second SAP data with data that is identical to the first SAP data (i.e., at least a portion of SAP data 214). As another example, executing the first program instructions may cause data storage device 204 to replace the second SAP data with a pointer that identifies a position within data storage device 204 where the first SAP data is stored. Other examples of the various functions carried during execution of the first program instructions are also possible.

Execution of the program instructions (e.g., second program instructions) to notify location detector 202 that the second SAP data is being modified to match the first SAP data may cause various functions to be carried out. For example, executing the second program instructions may cause processor 200 to generate a notification message (e.g., a first notification message) and to thereafter transmit the first notification message to location detector 202 via connection mechanism 206. The first notification message may include the first SAP data and/or a pointer to the first SAP data.

Transmission of the first notification message to location detector 202 may occur prior to processor 200 executing the first program instructions, while processor 200 is executing the first program instructions, or after processor 200 has executed the first program instructions. After location detector 202 receives the first notification message, location detector 202 may store the first SAP data and/or the pointer to the first SAP data, received in the first notification message, as data to use when location detector 202 generates a request for data to determine a location of user-device 102.

Execution of the program instructions (e.g., third program instructions) to send to location detector 202 a second request for the location of user-device 102 may cause various functions to be carried out. For example, executing the third program instructions may cause processor 200 to generate the second request and to then transmit the second request to location detector 202 via connection mechanism 206.

Returning to block 302, if processor 200 determines that the first SAP data matches the second SAP data, then block 306 may be carried out. Block 306 includes processor 200 executing computer-readable program instructions (e.g., the third program instructions) to send to location detector 202 the second request for the location of user-device 102. As described above for block 304, executing the program instructions to send to location detector 202 the second request for the location of user-device 102 may cause processor 200 to generate the second request and to then transmit the second request to location detector 202 via connection mechanism 206.

After processor 200 executes the program instructions (e.g., the third program instructions) to send the second request for the location of user-device 102 to location detector 202, location detector 202 may obtain data from a second location detector (e.g., location detector 114). Location detector 202 may obtain the data by requesting the second location detector to provide the data, and thereafter receiving the requested data. Location detector 202 may use the data obtained from the second location detector to determine the location of user-device 102, to confirm the accuracy of a determined location, to improve the accuracy of a determined location, or for some other reason.

After location detector 202 determines the location of user-device 102, location detector 202 may provide the determined location of user-device 102 to application 208. Application 208 may then use the determined location of user-device 102 for any of a variety of purposes, such as displaying a map and the location of user-device 102 at a particular position on the map. Other examples of using the determined location of user-device 102 are also possible.

Figure 4:
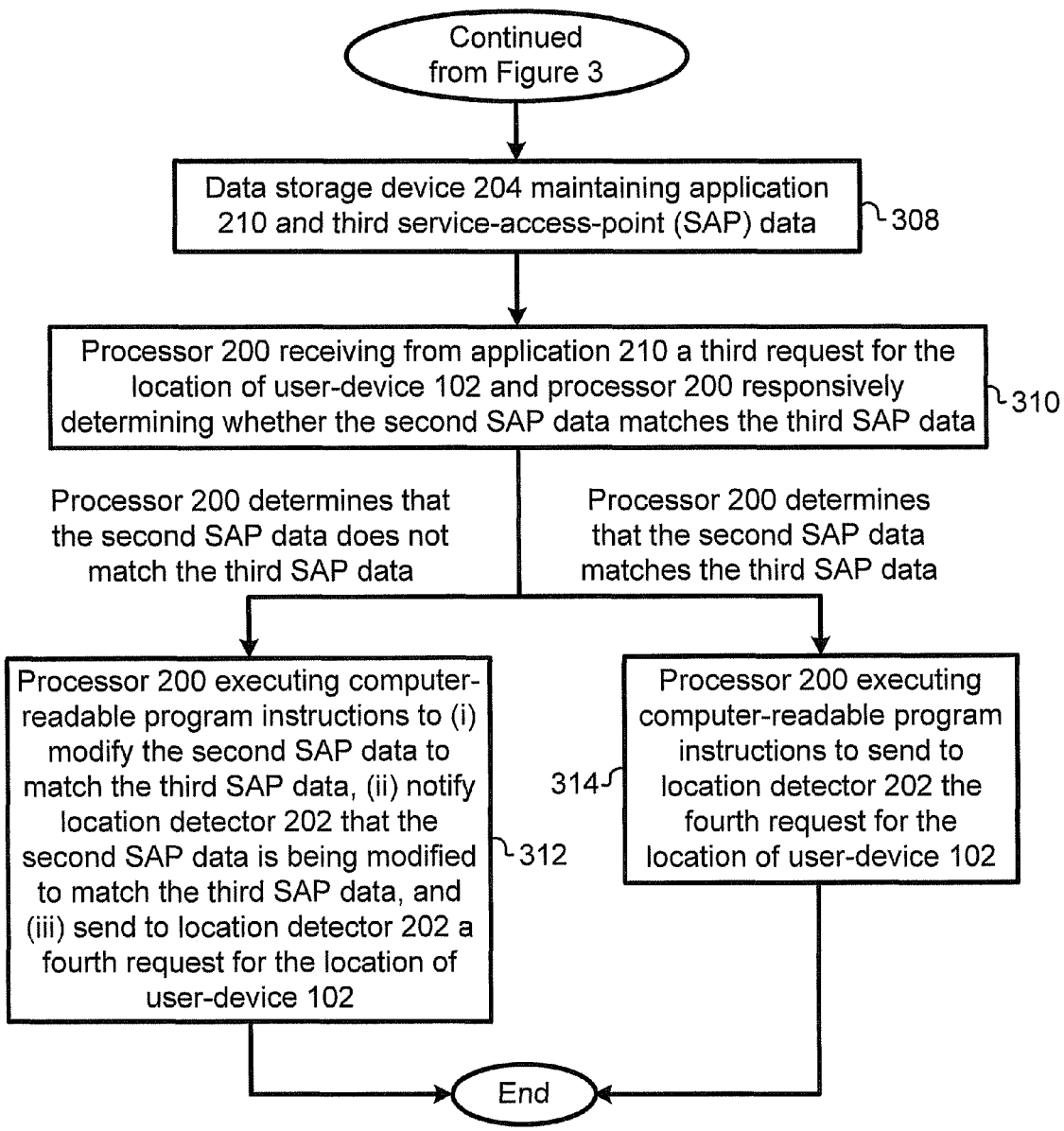
FIG. 4 is a flow chart depicting another set of functions that may be carried out in accordance with an exemplary embodiment.

Next, FIG. 4 is a flow chart provided to illustrate another set of functions that may be carried out in accordance with an exemplary embodiment. The functions of FIG. 4 are described as being carried out by various elements shown in FIG. 1 and/or FIG. 2. A person having ordinary skill in the art will understand that other elements shown in FIG. 1 or FIG. 2 may be substituted in place of some of the elements used to describe FIG. 4. For example, user-device 102 may be substituted with user-device 104, and/or application 210 may be substituted with application 212.

Block 308 includes data storage device 204 maintaining application 210 and third SAP data. As described above, application 210 may comprise a location-aware application. The third SAP data identifies a service-access-point through which user-device 102 may access a location detector other than location detector 202 (e.g., location detector 114, 116, or 118). The third SAP data (e.g., a service-access-point identified by SAP data 214) is associated with an application (e.g., application 210) and identifies a service-access-point through which user-device 102 may access a location detector other than location detector 202. The third SAP data may or may not match the second SAP data.

Next, block 310 includes processor 200 receiving from application 210 a third request for the location of user-device 102 and processor 200 responsively determining whether the second SAP data matches the third SAP data. The third request for the location of user-device 102 may be sent to processor 200 at any of a variety of times. For example, the third request may be sent to processor 200 at a time when application 210 is unaware of the location of the user-device 102. This may occur within a short time (e.g., 1 to 10 seconds) after processor 200 launches (e.g., begins executing) application 210. As another example, the third request may be sent to processor 200 at a time when application 210 is aware of the location of user-device 102. Application 210 may be aware of the location due to a location determination carried out prior to the third request being sent.

If processor 200 determines that the second SAP data does not match the third SAP data, then block 312 may be carried out. Block 312 includes processor 200 executing computer-readable program instructions to (i) modify the second SAP data to match the third SAP data, (ii) notify location detector 202 that the second SAP data is being modified to match the third SAP data, and (iii) send to location detector 202 a fourth request for the location of user-device 102. These program instructions may be contained within CRPI 218.

Execution of the program instructions to modify the second SAP data to match the third SAP data may cause various functions to be carried out. For example, executing these program instructions may cause data storage device 204 to replace the second SAP data with data that is identical to the third SAP data (e.g., at least a portion of SAP data 214). As another example, executing these program instructions may cause data storage device 204 to replace the second SAP data with a pointer that identifies a position within data storage device 204 where the third SAP data is stored. Other examples of the various functions carried during execution of the program instructions to modify the second SAP data to match the third SAP data are also possible.

Execution of the program instructions to notify location detector 202 that the second SAP data is being modified to match the third SAP data may cause various functions to be carried out. For example, executing the program instructions to notify location detector 202 that the second SAP data is being modified to match the third SAP data may cause processor 200 to generate a notification message (e.g., a second notification message) and to thereafter transmit the second notification message to location detector 202 via connection mechanism 206. The second notification message may include the third SAP data and/or a pointer to the third SAP data.

Transmission of the second notification message to location detector 202 may occur prior to processor 200 executing the program instructions to modify the second SAP data to match the third SAP data, while processor 200 is executing the program instructions to modify the second SAP data to match the third SAP data, or after processor 200 has executed the program instructions to modify the second SAP data to match the third SAP data. After location detector 202 receives the second notification message, location detector 202 may store the third SAP data as data to use when location detector 202 generates a request for data to determine a location of user-device 102.

Execution of the program instructions to send to location detector 202 a fourth request for the location of user-device 102 may cause various functions to be carried out. For example, executing the program instructions to send to location detector 202 a fourth request for the location of user-device 102 may cause processor 200 to generate the fourth request and to then transmit the fourth request to location detector 202 via connection mechanism 206.

Returning to block 310, if processor 200 determines that the second SAP data matches the third SAP data, then block 314 may be carried out. Block 314 includes processor 200 executing computer-readable program instructions to send to location detector 202 the fourth request for the location of user-device 102. As described above for block 312, executing the program instructions to send to location detector 202 the fourth request for the location of user-device 102 may cause processor 200 to generate the fourth request and to then transmit the fourth request to location detector 202 via connection mechanism 206.

After processor 200 executes the program instructions to send the fourth request for the location of user-device 102, location detector 202 may obtain data from a third location detector (e.g., location detector 116 or 118). Location detector 202 may obtain the data by requesting the third location detector to provide the data and receiving the requested data. Location detector 202 may use the data obtained from the third location detector to determine the location of user-device 102, to confirm the accuracy of a determined location, to improve the accuracy of a determined location, or for some other reason.

After location detector 202 determines the location of user-device 102, location detector 202 may provide the determined location of user-device 102 to application 210. Application 210 may then use the determined location of user-device 102 for any of a variety of purposes, such as displaying a map and the location of user-device 102 at a particular position on the map. Other examples using the determined location of user-device 102 are also possible.

4. Conclusion

Exemplary embodiments of the present invention have been described above. Those skilled in the art will understand that changes and modifications may be made to the described embodiments without departing from the true scope and spirit of the present invention, which is defined by the claims.

We claim:

1. At a user-device comprising a data storage device, a processor, and a first location detector, a method comprising:
    the data storage device maintaining a first application, first service-access-point (SAP) data, and second SAP data, wherein the first location detector is configured to (i) obtain data from a second location detector, (ii) determine a location of the user-device based, at least in part, on the data obtained from the second location detector, and (iii) provide the first application with the determined location of the user-device, and wherein the second location detector is accessible to the first location detector via a SAP identified by the second SAP data;
    the processor receiving from the first application a first request for the location of the user-device and, in response to receiving the first request, determining whether the first SAP data matches the second SAP data;
    if the processor determines that the first SAP data does not match the second SAP data, then the processor executing computer-readable program instructions to (i) modify the second SAP data to match the first SAP data, (ii) notify the first location detector that the second SAP data is being modified to match the first SAP data, and (iii) send to the first location detector a second request for the location of the user-device; and
    if the processor determines that the first SAP data matches the second SAP data, then the processor executing computer-readable program instructions to send to the first location detector the second request for the location of the user-device.

2. The method of claim 1, wherein after the processor sends the second request, the method further comprises:
    the first location detector obtaining the data from the second location detector;
    the first location detector determining the location of the user-device; and
    the first location detector providing the determined location of the user-device to the first application.

3. The method of claim 1, wherein the second SAP data comprises an Internet Protocol address that is associated with the second location detector.

4. The method of claim 3, wherein the second SAP data further comprises a port identifier that is associated with the second location detector.

5. The method of claim 1, wherein the user-device comprises a wireless communication device that is operable to make voice calls.

6. The method of claim 1, further comprising:
    the data storage device maintaining a second application and third SAP data, wherein the third SAP data is associated with the second application, and wherein the first location detector is configured to provide the second application with a location of the user-device based, at least in part, on data obtained from a third location detector in response to the second application requesting the location of the user-device;
    the processor receiving from the second application a third request for the location of the user-device and, in response to receiving the third request, determining whether the second SAP data matches the third SAP data;
    if the processor determines that the second SAP data does not match the third SAP data, then the processor executing computer-readable program instructions to (i) modify the second SAP data to match the third SAP data, (ii) notify the first location detector that the second SAP data is being modified to match the third SAP data, and (iii) send to the first location detector a fourth request for the location of the user-device; and
    if the processor determines that the second SAP data matches the third SAP data, then the processor executing computer-readable program instructions to send to the first location detector the fourth request for the location of the user-device.

7. The method of claim 1, wherein the processor executing computer-readable program instructions to notify the first location detector that the second SAP data is being modified to match the first SAP data includes the processor generating a notification message, and thereafter transmitting the notification message to the first location detector.

8. The method of claim 7,
    wherein the notification message includes the first SAP data, and
    wherein the first location detector is configured to store the first SAP data of the first notification message for use in generating the second request for the location of the user-device.

9. The method of claim 1, wherein the first location detector comprises computer-readable program instructions that are executable by the processor.

10. The method of claim 1, wherein the first location detector comprises a chipset configured to determine a location of the user-device from signals that are transmitted from a plurality of satellites of a global positioning satellite system.

11. The method of claim 1, wherein the second SAP data comprises a pointer to a portion of the first SAP data.

12. A user-device comprising:
    a processor;
    a data storage device that contains a first application, first service-access-point (SAP) data, and second SAP data; and
    a first location detector configured to obtain data from a second location detector, determine a location of the user-device based, at least in part, on the data obtained from the second location detector, and provide the first application with the determined location of the user-device,
    wherein the second location detector is accessible to the first location detector via a SAP identified by the second SAP data,
    wherein the processor is operable, in response to receipt of a first request for the location of the user-device, to determine whether the first SAP data matches the second SAP data,
    wherein if the processor determines that the first SAP data does not match the second SAP data, then the processor modifies the second SAP data to match the first SAP data, notifies the first location detector that the second SAP data is being modified to match the first SAP data, and sends to the first location detector a second request for the location of the user-device; and
    wherein if the processor determines that the first SAP data matches the second SAP data, then the processor sends to the first location detector the second request for the location of the user-device.

13. The user-device of claim 12, wherein the second location detector comprises position determining equipment (PDE) within a cellular communications network.

14. The user-device of claim 12, wherein the first location detector comprises computer-readable program instructions that are executable by the processor.

15. The user-device of claim 12, wherein the first location detector comprises a chipset configured to determine a location of the user-device from signals that are transmitted from a plurality of satellites of a global positioning satellite system.

16. The user-device of claim 12,
wherein the data storage device further contains first computer-readable program instructions that are executable as a Java virtual machine, and second computer-readable program instructions that are executable as a binary runtime environment for wireless (BREW) layer between the Java virtual machine and the second location detector, and
wherein the first computer-readable program instructions and the second computer-readable program instructions are executable by the processor.

* * * * *